(12) United States Patent
Al-Shihabi et al.

(10) Patent No.: US 12,411,838 B2
(45) Date of Patent: Sep. 9, 2025

(54) SCHEMA SNAPSHOT ISOLATION ACCESS IN A RELATIONAL DATABASE

(71) Applicant: Microsoft Technology Licensing, LLC, Redmond, WA (US)

(72) Inventors: Noah Amin Al-Shihabi, Seattle, WA (US); Panagiotis Antonopoulos, Redmond, WA (US); Hanumantha Rao Kodavalla, Sammamish, WA (US); Nikolas Christopher Ogg, Seattle, WA (US); Divyesh Rameshchandra Tikmani, Telangana (IN); Wonseok Kim, Sammamish, WA (US); Alexander Wai-man Swanson, Redmond, WA (US); Rajat Jain, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/428,887

(22) Filed: Jan. 31, 2024

(65) Prior Publication Data
US 2025/0156400 A1    May 15, 2025

Related U.S. Application Data

(60) Provisional application No. 63/598,826, filed on Nov. 14, 2023.

(51) Int. Cl.
*G06F 16/23* (2019.01)
*G06F 16/2453* (2019.01)

(52) U.S. Cl.
CPC ...... *G06F 16/2379* (2019.01); *G06F 16/2343* (2019.01); *G06F 16/24542* (2019.01)

(58) Field of Classification Search
CPC ............ G06F 16/2379; G06F 16/2343; G06F 16/24542; G06F 16/00
See application file for complete search history.

(56) References Cited

U.S. PATENT DOCUMENTS

| | | | |
|---|---|---|---|
| 7,644,106 B2 * | 1/2010 | Shankar | G06F 16/2343 707/999.201 |
| 8,688,703 B1 * | 4/2014 | Antova | G06F 16/258 713/193 |

(Continued)

OTHER PUBLICATIONS

Ghanayem, et al., "Create View (Transact-SQL)", Retrieved from: https://learn.microsoft.com/en-us/sql/t-sql/statements/create-view-transact-sql?view=sql-server-ver15#remarks, May 23, 2023, 17 Pages.

(Continued)

*Primary Examiner* — William P Bartlett
(74) *Attorney, Agent, or Firm* — Weaver IP L.L.C.

(57) ABSTRACT

Relational database systems are disclosed that are enabled to operate with versioned metadata. The relational database system includes a lock manager, a transaction manager and a version aware metadata storage and cache configured to store to store and manage versions of metadata, to determine which of such versions should be visible at any given point in time, and to enable creation of the proper versions of metadata. In an aspect, the transaction manager manages transaction identifiers and their associated start times, abort times and/or commit times. Such data enables determination of transaction visibility, and consequently the metadata version visibility, for any point in time. In an aspect, such metadata versioning support enables snapshot isolation of metadata transactions.

20 Claims, 9 Drawing Sheets

(56) References Cited

U.S. PATENT DOCUMENTS

| | | | |
|---|---|---|---|
| 10,977,227 B2* | 4/2021 | Lee | G06F 16/219 |
| 2011/0302143 A1* | 12/2011 | Lomet | G06F 16/2322 |
| | | | 707/704 |
| 2011/0313999 A1* | 12/2011 | Bruno | G06F 16/24542 |
| | | | 707/718 |
| 2018/0011895 A1* | 1/2018 | Johnson | G06F 16/27 |
| 2018/0121494 A1* | 5/2018 | Antonopoulos | G06F 16/2365 |
| 2022/0300483 A1* | 9/2022 | Singh | G06F 16/2474 |
| 2022/0414081 A1* | 12/2022 | Ravella | G06F 16/2365 |

OTHER PUBLICATIONS

To, et al., "Table Hints (Transact-SQL)", Retrieved from: https://learn.microsoft.com/en-us/sql/t-sql/queries/hints-transact-sql-table?view=sql-server-ver15, Oct. 4, 2023, 20 Pages.

* cited by examiner

| emp_id | emp_name | job_name | manager_id | hire_date | salary | commission | dep_id |
|---|---|---|---|---|---|---|---|
| 68319 | KAYLING | PRESIDENT | | 1991-11-18 | 6000.00 | | 1001 |
| 66928 | BLAZE | MANAGER | 68319 | 1991-05-01 | 2750.00 | | 3001 |
| 67832 | CLARE | MANAGER | 68319 | 1991-06-09 | 2550.00 | | 1001 |
| 65646 | JONAS | MANAGER | 68319 | 1991-04-02 | 2957.00 | | 2001 |
| 67858 | SCARLET | ANALYST | 65646 | 1997-04-19 | 3100.00 | | 2001 |
| 69062 | FRANK | ANALYST | 65646 | 1991-12-03 | 3100.00 | | 2001 |
| 63679 | SANDRINE | CLERK | 69062 | 1990-12-18 | 900.00 | | 2001 |
| 64989 | ADELYN | SALESMAN | 66928 | 1991-02-20 | 1700.00 | 400.00 | 3001 |
| 65271 | WADE | SALESMAN | 66928 | 1991-02-22 | 1350.00 | 600.00 | 3001 |
| 66564 | MADDEN | SALESMAN | 66928 | 1991-09-28 | 1350.00 | 1500.00 | 3001 |
| 68454 | TUCKER | CLERK | 66928 | 1991-09-08 | 1600.00 | 0.00 | 3001 |
| 68736 | ADNRES | CLERK | 67858 | 1997-05-23 | 1200.00 | | 2001 |
| 69000 | JULIUS | CLERK | 66928 | 1991-12-03 | 1050.00 | | 3001 |
| 69324 | MARKER | CLERK | 67832 | 1992-01-23 | 1400.00 | | 1001 |

TABLE Employees
202

EXAMPLE Snapshot Isolation 314

| Metadata Modification Command 302 | Lock Type 304 | TIME 306 | Data Read Command 308 | Lock Type 310 | Comments 312 |
|---|---|---|---|---|---|
| | | T1 | BEGIN TRANSACTION | | |
| | | T2 | SELECT * FROM Employees | SCH-A | Execution Started |
| | | T3 | | SCH-A | Executing |
| | | T4 | | SCH-A | Executing |
| | | T5 | | SCH-A | Executing |
| ALTER TABLE Employees ADD RemainingSickDays | SCH-C | T6 | | SCH-A | Executing |
| | | T7 | | SCH-A | Executing |
| SELECT TOP 10 * FROM Employees | | T8 | | SCH-A | Executing |
| COMMIT TRANSACTION | | T9 | | SCH-A | Executed (New column 'RemainingSickDays' NOT visible) |
| | | T10 | SELECT TOP 10 * FROM Employees | SCH-A | New column 'RemainingSickDays' NOT visible |
| | | T12 | COMMIT TRANSACTION | | |
| | | T13 | BEGIN TRANSACTION | | |
| | | T14 | SELECT TOP 10 * FROM Employees | SCH-A | New column 'RemainingSickDays' IS visible |
| | | T15 | COMMIT TRANSACTION | | |

FIG. 3

EXAMPLE
Read Committed Snapshot Isolation
414

| Metadata Modification Command (402) | Lock Type (404) | TIME (406) | Data Read Command (408) | Lock Type (410) | Comments (412) |
|---|---|---|---|---|---|
| | | T1 | BEGIN TRANSACTION | | |
| | | T2 | SELECT * FROM Employees | SCH-A | Execution Started |
| | | T3 | | SCH-A | Executing |
| | | T4 | | SCH-A | Executing |
| ALTER TABLE Employees ADD RemainingSickDays | SCH-C | T5 | | SCH-A | Executing |
| | | T6 | | SCH-A | Executing |
| SELECT TOP 10 * FROM Employees | | T7 | | SCH-A | Executing |
| | | T8 | | SCH-A | Executing |
| | | T9 | | SCH-A | Executed (new column 'RemainingSickDays' not visible) |
| | | T10 | SELECT TOP 10 * FROM Employees | SCH-A | New column 'RemainingSickDays' not visible |
| COMMIT TRANSACTION | | T11 | | | |
| | | T12 | SELECT TOP 10 * FROM Employees | SCH-A RECOMPILE | New Snapshot New column 'RemainingSickDays' visible |
| | | T13 | COMMIT TRANSACTION | | |

FIG. 4

SCHEMA SNAPSHOT ISOLATION ACCESS IN A RELATIONAL DATABASE

CROSS-REFERENCE TO RELATED APPLICATIONS

This application claims priority to U.S. Provisional Patent Application Ser. No. 63/598,826, filed Nov. 14, 2023, and titled "SCHEMA SNAPSHOT ISOLATION ACCESS IN A RELATIONAL DATABASE," the entirety of which is incorporated by reference herein.

BACKGROUND

Relational database systems (e.g., Microsoft SQL Server) typically require full synchronization between read queries and data definition language operations ("DDLs") that modify schemas because metadata is not versioned. Thus, all DDLs require a full exclusive lock (i.e., a schema modification lock denoted as SCH-M) on all schema objects being modified to synchronize with any concurrent read queries that require access to these objects. This requirement imposes certain operational limitations.

For example, a requested SCH-M lock required for a DDL operation may not be granted until all queries that depend on the schema being modified have completed thus blocking the DDL operation and causing a period of unavailability that significantly impacts the execution performance of a workload. Likewise, while the DDL operation is waiting for ongoing queries to complete, new queries submitted after the SCH-M lock is requested are also blocked, further extending the window of unavailability.

Further, DDL operations invalidate any snapshot transaction that attempts to access the schema objects after the DDL operation commits since the schema associated with the transaction snapshot no longer exists after the DDL operation commits, and thus can no longer be retrieved. This causes unexpected failures of workload queries, and such queries must be retried further impacting performance of the workload.

Likewise, the fact that DDL operations need to wait for all ongoing queries to complete before they can get the schema modification lock and proceed significantly impacts the health of secondary replicas. Secondary replicas rely on log replication, and such log replication must wait for extended periods of time as it might be blocked behind long-running analytical queries which are common on secondary replicas. This can lead to accumulating a large log on a primary replica and eventually running out of log space. Furthermore, replication of such large logs results in long recovery times and unavailability of the secondary replica when it restarts or when a database is failed over to the secondary replica since it needs to redo all of the accumulated logs for the replica.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Relational database systems are described herein that are enabled to operate with versioned metadata. The relational database system includes a lock manager, a transaction manager and a version aware metadata storage and cache configured to store and manage versions of metadata, to determine which of such versions should be visible at any given point in time, and to enable creation of the proper versions of metadata. In an aspect, the transaction manager manages transaction identifiers and their associated start times, abort times and/or commit times. Such data enables determination of transaction visibility, and consequently the metadata version visibility, for any point in time. In an aspect, metadata versioning enables snapshot isolation of metadata transactions.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 2 depicts an example logical employee table stored in an example SQL database, according to an example embodiment.

FIG. 3 depicts an example logical timeline of concurrent data read and metadata modification transactions using snapshot isolation, according to an example embodiment.

FIG. 4 depicts an example logical timeline of concurrent data read and metadata modification transactions using read committed snapshot isolation, according to an example embodiment.

Figure 1:
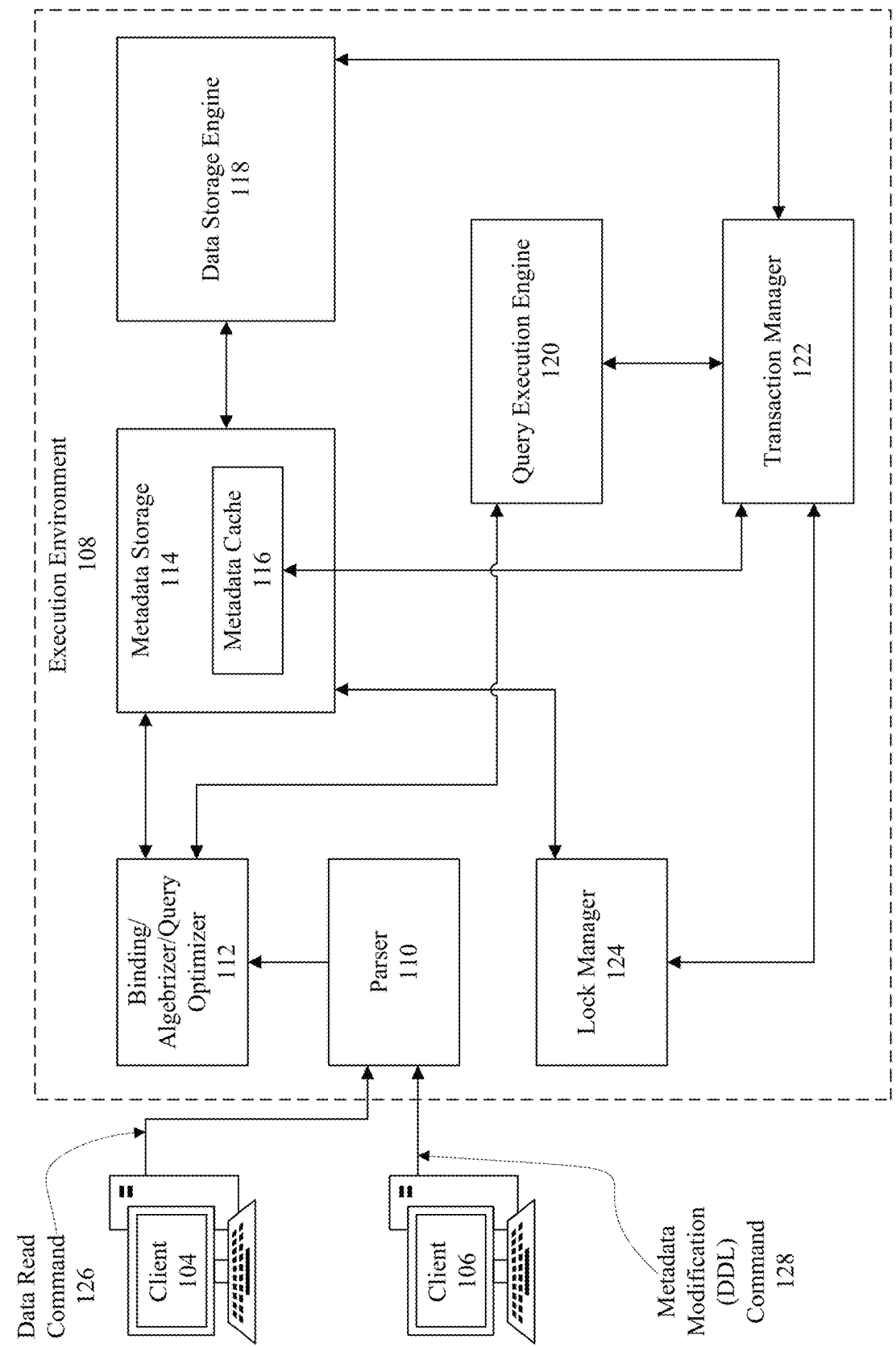
FIG. 1 depicts an example relational database system providing versioned metadata, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Embodiments herein are described in the context of a relational database system that provides versioned metadata. For example, Microsoft® SQL Server and similar relational database systems have historically operated as a "single master" database application that lacks metadata versioning and requires metadata modification to be performed by a single process that has full and exclusive access to the metadata objects being modified. These limitations result in severe scalability problems because transaction ACID (Atomicity, Consistency, Isolation and Durability) compliance is achieved at the expense of concurrency. Embodiments disclosed herein, on the other hand, overcome these "single master" metadata issues by providing relational database systems with native metadata versioning and new lock schemes that enable modification of metadata objects concurrently with read operations that reference or depend on such metadata objects. As described further below, the disclosed embodiments of a relational database system using versioned metadata enables, among other things, snapshot isolation of data definition language ("DDL") operations that modify metadata objects (e.g., a database schema).

For example, consider FIG. 2 which depicts an example logical employees table 202 that may be stored in an example SQL database, according to an example embodiment. Table 202 includes rows and columns. Each row corresponds to a particular employee whereas each column corresponds to information about each respective employee. Each row may be thought of as a record, and each of the corresponding column entries for a record may be considered data fields of the corresponding record. For example, the first column labeled emp_id includes the employee ID for each employee. Likewise, other columns include data such as the name, job title and the like. Every table has a corresponding metadata object stored in the database. The metadata object includes, as the name implies, data about data. In particular, data about the data stored in the table to which the object corresponds. Thus, for example, the metadata that corresponds to Table 202 identifies each column and specifies its data type. When, for example, a DDL command causes a column to be added or dropped from a table, the metadata object that corresponds to that table must likewise be modified to reflect the new logical structure of the table.

Snapshot isolation of metadata transactions enables virtually the same benchmark performance to be maintained by relational database systems with versioned metadata as for relational database systems without versioned metadata. Furthermore, overall system performance is significantly improved by reducing the blocking ordinarily caused by DDL operations (schema changes) that typically issue a great many read operations.

A general description of example operating environments is provided below, followed by a detailed description of these and further example embodiments.

Conventional relational database systems require a full exclusive lock to execute metadata modification commands such as DDL statements. The consequence of this is that a snapshot transaction (e.g., a read query) that attempts to access a metadata object after a DDL transaction commits will fail since the original schema based on the transaction snapshot can no longer be retrieved. Embodiments, on the other hand, enable such read transactions to succeed by referencing the version of metadata that existed before the DDL transaction committed.

In particular, embodiments enable concurrent access to metadata objects while they are being modified by supporting multiple versions of those objects. Each schema modification of an object (e.g., via DDL command) creates a new version of the object, and other accessors can still access the version of the object that corresponds to the snapshot of their transaction. For many common DDL operations, all this occurs without blocking between common DDL operations and other accesses (i.e., providing full read access to the data during such operations). Similarly, continuous redo is not blocked by long-running analytical queries, so the logs on primaries are enabled to be cleared before getting too large, and recovery time is reduced as a result of a smaller redo log.

Embodiments include a reconfiguration of metadata layers to support multi-versioning. This is similar to how Multi-Versioning Concurrency Control (MVCC) works for data but in this case, implemented for metadata. The content of system tables and metadata caches is versioned and enables versioned access following the Snapshot Isolation semantics. In examples, introduced algorithms enable:

1) Querying for metadata objects based on different attributes (e.g., identifier (ID), name, etc.) and finding the most relevant version of an object even if multiple of these attributes might have changed over time (e.g., when a table is renamed).
2) Reloading the cache by discovering all possibly visible versions of a record within the corresponding system tables to guarantee that all the necessary versions of the objects are correctly loaded.
3) Versioned accesses of the caches and underlying system tables using the corresponding transaction or statement snapshot information and following the semantics (snapshot isolation modes) of Snapshot Isolation or RCSI (Read Committed Snapshot Isolation).
4) Reconfigure how snapshots are established and used in the system to guarantee that query compilation (that accesses metadata) can perform versioned access to load the correct version of the object and not block behind any ongoing DDLs. This algorithm also allows for internal retries to minimize failures that can occur due to schema inconsistencies without surfacing them to the users.
5) Reconfigure SQL locking semantics around metadata access by introducing two new lock types that allow us to control which DDL operations and accesses (e.g., depending on the isolation level) should support concurrency or not. Beyond allowing concurrent access between DDLs and queries, our design can support versioned access to schema information for temporal (AS OF) queries. This enables users to access their tables in the same shape/configuration they had at the specified time.

Embodiments enable advantages over conventional techniques. For instance, embodiments enable advantages over the following conventional techniques:

1) Semi-structured data stores, like document stores, that allow for flexible schemas: These systems fundamentally do not face similar challenges due to their loose schema definition that allows different rows/documents to have different schema. Despite this benefit, such systems are challenging for developers to keep their applications and data aligned since it is very easy for the schema to diverge over time. Embodiments disclosed herein enable concurrent DDL and queries while still supporting a strict schema definition.

2) RDBMSs (relational database management systems) that support similar functionality. One key difference is that such conventional systems were designed from scratch to support versioned metadata. Embodiments disclosed herein enable retrofitting versioning to existing, non-versioned RDBMSs.

These and further features, configurations, and advantages are described as follows with reference to FIG. 1. FIG. 1 depicts an example relational database system 100 providing versioned metadata. As shown in FIG. 1, relational database system 100 includes an execution environment 108, a client 104, a client 106. Execution environment 108 includes a binding/algebrizer/query optimizer 112, a parser 110, a lock manager 124, a metadata storage 114, a data storage engine 118, a query execution engine 120 and a transaction manager 122. Metadata storage 114 includes a metadata cache 116. Other structural and operational embodiments will be apparent to persons skilled in the relevant art(s) based on the following discussion regarding relational database system 100 as depicted in FIG. 1.

The interconnections between each of client 104, client 106 and execution environment 108 as depicted in FIG. 1 may represent network interconnections, in an embodiment. For example, such network connections are made via the Internet. However, portions of the depicted connections may utilize other networks such as local area networks (LANs), wide area networks (WANs), enterprise networks, and may include one or more of wired and/or wireless portions. Moreover, the interconnections depicted in FIG. 1 may represent direct connections between some or all of the various components. In other embodiments, some or all of the depicted components may be incorporated into a single system whereby the depicted interconnections are logical rather than physical. For example, some or all of transaction manager 122, data storage engine 118, query execution engine 120, and the like, may together or alone be incorporated into the same component as separate logical operating units with the depicted interconnections comprising data flows between the operating units, but internal to the same physical component.

Clients 104 and 106 in different embodiments are any number, type, or combination of computing devices or computing systems, including a terminal, a personal computer, a laptop computer, a tablet device, a smart phone, a personal digital assistant, a server(s), a gaming console, and/or the like, including internal/external storage devices, that are utilized to execute functions/operations described herein for performing operations on relational database system 100, e.g., providing queries to a SQL server, as well as for performing client-side functions/operations of client-server scenarios. Clients 104 and 106 also include additional components (not shown for brevity and illustrative clarity) including, but not limited to, components and subcomponents of other devices and/or systems herein, in various embodiments.

Clients 104 and 106 may be a computing device associated with a domain which, as used herein, generally refers to a physical and/or logical system boundary under the control of an entity within which applications and/or services are hosted, offered, managed, and/or otherwise implemented, and also encompasses subdomains and/or the like in embodiments. Exemplary, non-limiting domains include, without limitation, web domains, tenancies of hosted cloud platforms, cloud service providers, enterprise systems, and/or any other type of network or system. A tenant is particular type of domain that is a representation of an organization in a cloud platform. The domain of the tenant in the cloud platform is its tenancy in which the tenant registers and manages applications, stores data/files, accesses services, etc.

Data storage engine 118 and metadata storage 114 may comprise or include any type and/or number of data storage devices or systems, and may comprise internal and/or external storage in various embodiments. That is, for example, metadata storage 114 may comprise a monolithic storage device/system, a cloud-based storage system, a distributed storage system, and/or the like.

Moreover, although each of clients 104 and 106, metadata storage 114, lock manager 124, data storage engine 118, query execution engine 120 and transaction manager 122 in FIG. 1 are depicted as monolithic components, it should be understood that such components may be embodied in any number of computing devices including servers, and may include any type and number of other resources, including resources that facilitate communications with and between computing devices connected via one of the aforementioned networks. In embodiments, servers implementing these components may be organized in any manner, including being grouped in server racks (e.g., 8-40 servers per rack, referred to as nodes or "blade servers"), server clusters (e.g., 2-64 servers, 4-8 racks, etc.), or datacenters (e.g., thousands of servers, hundreds of racks, dozens of clusters, etc.). In an embodiment, the servers of may be co-located (e.g., housed in one or more nearby buildings with associated components such as backup power supplies, redundant data communications, environmental controls, etc.) to form a datacenter, or may be arranged in other manners. Accordingly, in an embodiment, clients 104 and 106, metadata storage 114, lock manager 124, data storage engine 118, query execution engine 120 and transaction manager 122 may comprise a datacenter in a distributed collection of datacenters.

Each of client 104 and 106 work off the same user database(s), performs updates thereto, and can access data and/or metadata as of any prior point in time, in an embodiment. Moreover, and as will be described further herein below, a schema of the objects in any database may be altered by one of client 104 or 106 while the other client or other clients (not shown) are running a concurrent query that is scanning the same schema. Such alterations and deletions are typically performed by executing DDL operations. For example, and as will be described below, a user of client 104 or 106 may connect to execution environment 108 of relational database system 100 and execute a T-SQL DDL statement. Relational database system 100 may perform the alteration/deletion by executing the command in a transaction. As mentioned above, such transactions must be ACID compliant as will now be described in further detail.

As mentioned herein above, data and/or metadata modifications performed by relational database system 100 are performed in the context of an ACID compliant transaction, and embodiments of relational database system 100 are ACID compliant. As known in the art, ACID is an acronym that denotes a set of properties of database transactions that ensure that data (or metadata) persisted to the database are valid despite errors that may arise due to, for example, hardware failures or power failures. The ACID properties are: Atomicity, Consistency, Isolation and Durability. Transactions performed by relational database system 100 are ACID compliant inasmuch as the operations that logically correspond to the transaction collectively satisfy the ACID properties.

The Atomicity property of a transaction demands that the transaction either completely succeed, or completely fail. For a transaction to completely fail means that the database is left unchanged. For example, suppose a transaction comprises transferring money from account A to account B. The entire transaction comprises a number of steps as follows: funds are debited from account A, funds are transferred to wherever account B is held, and funds are credited to account B. In this situation, atomicity guarantees that no funds are debited from account A if, for whatever reason, funds are not credited to account B.

The Consistency property ensures that a transaction conform to all applicable rules governing the storage of the data such that the transaction brings the database from one valid state to another valid state.

The Isolation property ensures that different transactions that execute concurrently leave the database in the same state that would have been obtained if the transactions were executed in series. Isolation is the main goal of concurrency control, and embodiments discussed further herein below enforce such concurrency controls on metadata operations with relational database system 100.

Finally, the Durability property guarantees that once a transaction is committed (i.e., completed and persisted to the database in an ACID compliant manner), the transaction will remain committed and that no hardware, system or power failure can cause the transaction to be lost or for the database to enter an otherwise inconsistent state. With further reference to relational database system 100 of FIG. 1, ACID properties of transactions performed by relational database system 100 are ensured, in part, through the use of logging performed as follows.

In order to maintain the ACID properties of the transaction, embodiments of relational database system 100 may be configured to generate a log record for a transaction when the transaction commits and store that record in a transaction log before any data modifications caused by the transaction are written to disk. In an embodiment, logging may be handled by, for example, transaction manager 122 or data storage engine 118, alone or in combination with one another. In other embodiments, however, a dedicated logging component (not shown in FIG. 1) may be employed to manage the storage and retrieval of such transaction logs.

A log record for a committed transaction includes all the information necessary to re-do the transaction in the event there is a problem (e.g., power failure) before the data modified by the transaction can be stored (e.g., in data storage engine 118). A log record may comprise information that includes, but is not limited to, a transaction identifier, a log sequence number, a time stamp, information indicating what data object or objects was/were modified and how, and the like. In an embodiment, the log record information is managed and/or provided by transaction manager 122.

In an embodiment, transaction manager 122 may be configured to maintain a transaction ID and start time for a transaction. Transaction manager 122 may be centralized and available to provide transaction services to all clients and/or replicas of relational database system 100. Embodiments may be configured to acquire a list of active and aborted transactions as of any point in time from transaction manager 122, and to use such information for versioning purposes as described further herein below. Furthermore, embodiments may acquire locks through lock manager 124 as needed. Such locks will now be further described.

Relational database systems use locks to maintain the database in a consistent state by ensuring that any read, scan or other use of metadata objects will reflect a valid state of such metadata objects. Conventional relational database systems do not provide versioned metadata and as such, there can only be one valid state for a metadata object. The consequence of this for conventional relational database systems, and as described above, is that metadata objects that are currently being scanned or otherwise read cannot be modified and likewise, metadata objects that are in the process of being modified cannot be scanned or otherwise read. Locks are the mechanism by which these restrictions are enforced.

Suppose, for example, that a metadata modification command (i.e., DDL) is being executed in a transaction. To enforce the restrictions of conventional relational database systems described immediately herein above, execution of the DDL will require a lock on the metadata object(s) being modified. Prior to such modification, the relational database system will request an exclusive schema modification lock (denoted as "SCH-M") from, for example, lock manager 124 or an analogous component. Lock manager 124 will provide and enforce such a lock only after ensuring that no other transaction is reading or scanning the metadata object to be modified. Likewise, a read/scan of a metadata object also requires a lock which similarly prevents a metadata modification from taking place. Such a lock is referred to as a schema stability (SCH-S) lock.

As a result, the SCH-M and SCH-S locks are mutually exclusive. That is, a lock manager such as, for example, lock manager 124 will not issue a SCH-M lock for a schema change DDL until no SCH-S locks are outstanding. Likewise, a SCH-S lock will not be provided until there are no SCH-M locks outstanding. The overall result for conventional systems is that metadata reads and writes are mutually exclusive and may not be executed concurrently. The disclosed embodiments, on the other hand, allow metadata reads and writes to be executed concurrently through the use of versioned metadata, and by introducing new lock types.

Versioning-based snapshot isolation of metadata transactions is enabled in part by maintaining transaction versions for every metadata version metadata storage 114 and in metadata cache 116 of metadata storage 114. Metadata cache 116 provides a high speed access to metadata objects and their various versions, whereas metadata storage 114 includes a physical storage in a non-volatile memory. Of course, the contents of high speed metadata cache 116 must be kept in sync with the physical record stored elsewhere within metadata storage 114.

Versioning-based snapshot isolation of metadata transactions is further enabled by providing the means to determine which version of a metadata object is visible to a given transaction. In an embodiment, transaction manager 122 may maintain a transaction visibility list for each transaction that dictates which transactions, and consequently which metadata version(s), are visible to that transaction. In other embodiments, however, some combination of transaction manager 122, metadata storage 114, data storage engine 118 and/or lock manager 124 may be configured alone or in combination to enable embodiments to determine which versions of metadata objects are available to a particular transaction. Versioning-based snapshot isolation is thereby enabled in the following general manner.

The versioning framework of the disclosed embodiments invoke a copy-on-write mechanism when metadata is modified or deleted. This requires that while the transaction performing such modification or deletion is still running, the old version of the metadata must be available for transactions that require an earlier transactionally consistent state. Accordingly, when a versioning-based isolation level is enabled, metadata storage 114 stores a version of a metadata object each time that object is modified. Each new version of the metadata object may, for example, be stored along with the transaction identifier of the transaction that committed the modification along with a commit timestamp thereby allowing embodiments to determine the point in time when a given version came into existence. Alternatively, committed transactions IDs and associated timestamps may be maintained separately from the versions that correspond to same.

FIGS. 3 and 4 depict example logical timelines of concurrent metadata read and write transactions under two different snapshot isolation schemes, according to an example embodiment. In particular, FIG. 3 depicts an example logical timeline 300 of concurrent data read and metadata modification transactions using example snapshot isolation 314, whereas FIG. 4 depicts an example logical timeline 400 of concurrent data read and metadata modification transactions using read committed snapshot isolation 414. Differences between snapshot isolation 314 of FIG. 3 and read committed snapshot isolation 414 of FIG. 4 are described as follows.

With regard to snapshot isolation 314 and read committed snapshot isolation 414, the term "snapshot" reflects the fact that all queries in a transaction see (are applied to) the same version, or "snapshot", of the database based on the state of the database at the moment in time when the transaction begins. The term "isolation" refers to the fact that different transactions that see different versions of the database may nevertheless run concurrently because the snapshots effectively isolate such transactions from one another.

The difference between read committed snapshot isolation and snapshot isolation is that version visibility is scoped to the statement level in read committed snapshot isolation, whereas such visibility is scoped to the transaction level for snapshot isolation. This difference will be better appreciated through further consideration of FIGS. 3 and 4. Timeline 300 of FIG. 3 is set forth as a table having rows and columns and wherein the time axis runs vertical up and down the table. That is, moving down from one row to the next is equivalent to moving forward in time (i.e., moving down the table means moving forward in time). Timeline 300 of FIG. 3 includes the following columns: metadata modification command 302, lock type 304, time 306, data read command 308, lock type 310 and comments 312.

Metadata modification command 302 of FIG. 3 depicts a transaction that modifies metadata. In particular, the ALTER TABLE statement at time=T6 causes a new column to be added to table named 'Employees' which causes the metadata object associated with table 'Employees' to be modified. The transaction for the ALTER TABLE command starts at time=T4 and commits at time=T9.

Data read command 308 of FIG. 3 includes two transactions. The first transaction starts at time=T1 and commits at time=T12, whereas the second transaction begins at time=T13 and commits at time=T15. The first transaction includes two SELECT statements that begin executing at time=T2 and time=T10, and which cause data and metadata to be read. Per snapshot isolation semantics, the SELECT statement that begins executing at time=T2 does NOT see the new column 'RemainingSickDays' that is added by metadata modification command 302 because the change brought about by metadata modification command 302 does not exist until such time that its corresponding transaction commits at time=T9.

The second SELECT statement executes inside the first transaction at time=T10. Note, time=T10 is AFTER metadata modification command 302 has committed so in theory, the modified metadata should be available for statements that execute after that point. With snapshot isolation, however, visibility of metadata modifications is scoped to the transaction level. Accordingly, metadata versions that are visible cannot change during the course of a transaction, and the visible metadata version is fixed to the point in time when a transaction starts. With continued reference to FIG. 3, the second transaction that starts at time=T13 *does* see the modified metadata since that transaction started (at time=T13) well after the transaction of metadata modification command 302 committed (at time=T9).

In read committed snapshot isolation, on the other hand, visibility of metadata modifications is scoped to the statement level, and not the transaction level. This difference will now be described with reference to timeline 400 of FIG. 4 which includes the following columns: metadata modification command 402, lock type 404, time 406, data read command 408, lock type 410 and comments 412.

Metadata modification command 402 of FIG. 4 depicts a transaction that modifies metadata. In particular, the ALTER TABLE statement at time=T5 causes a new column to be added to table named 'Employees' which causes the metadata object associated with table 'Employees' to be modified. The transaction for the ALTER TABLE command starts at time=T3 and commits at time=T11.

Data read command 408 of FIG. 4 includes one transaction that executes three SELECT statements. The transaction starts at time=T1 and commits at time=T13. The first SELECT statement begins executing at time=T2 and completes executing at time=T9. The second select statement executes at time=T10, and the third SELECT statement executes at time=T12. Of course, the result of metadata modification command 402 cannot possibly be visible to any transaction or statement until such time as its transaction commits at time T=T11. Accordingly, the new column added by the ALTER TABLE statement at T=T5 is not visible to either of the first two SELECT statements that start at time=T2 and time=T10. However, the SELECT statement that executes at time=T12 does so *AFTER* metadata modification command transaction commits at time=T11. Because of this, and also because example 402 is using read committed snapshot isolation, the new column added by metadata modification command 402 *is* visible to the SELECT statement at time=T12. This is the case because in read committed snapshot isolation, visibility is determined for each statement in a transaction. In snapshot isolation, on the other hand, visibility is determined for an entire transaction and not for each statement within that transaction.

In an embodiment, the SELECT statement or data read command 408 that executes at time=T10 causes a query plan to be generated and then optimized by binding/algebrizer/ query optimizer 112, and that query plan is subsequently executed by query execution engine 120. In an embodiment, the compiled query plan is cached and re-used for subsequent executions of the same statement. With continued reference to FIG. 4, although the SELECT statement that executes at time=T12 is the same statement as the one that executed at time=T10, the query plan compiled for the latter SELECT statement cannot be used because that plan refers to an old version of metadata that corresponds to the Employees table before the new column was added by the ALTER TABLE command at time=T5. Embodiments will detect that the cached query plan that was generated when the SELECT statement at time=T10 was executed is, in fact, stale since it refers to the wrong version of the metadata, and accordingly embodiments will re-compile the query plan to refer to the proper version(s) of metadata. The recompiled query plan may then be executed and doing so as depicted in data read command 408 at time=T12 will illustrate that the new column added by the ALTER TABLE of metadata modification command 402 is, in fact, visible.

Example logical timelines 300 and 400 of FIGS. 3 and 4, respectively, also include lock type columns 304, 310, 404 and 410. The lock type column reflects the lock type being requested and held by a statement inside the transaction. As described herein above, conventional lock types include a schema modification lock (SCH-M) and a schema stability lock (SCH-S). Embodiments of relational database system 100 also include and use these types of locks. This is true because some metadata modification commands (i.e., DDL commands) are not compatible with nor make use of versioned metadata, and too because some metadata operations should and/or must have exclusive access to the metadata object.

For these reasons, embodiments implement two new lock types called access schema version and create schema version denoted by 'SCH-A' and 'SCH-C', respectively. These lock types are used for statements and DDL operations that are version aware and compatible (e.g., ALTER TABLE and/or SELECT, as described above). Due to the use of versioned metadata, there is no longer a need for full and exclusive access to a metadata object. A statement that requests and receives a SCH-A lock from, for example, lock manager 124 will automatically see the metadata versions visible to it when the statement begins to execute. Likewise, a statement like ALTER TABLE that requests and receives a SCH-C lock may change a metadata object without being blocked by a corresponding read when the result of the ALTER TABLE is a new version of the metadata object. Accordingly, there is no conflict between the locks, neither such lock blocks the other and the database is ACID compliant and maintained in a consistent state.

In embodiments, the schema modification lock (SCH-M) mentioned above is acquired when a DDL statement is executed and prevents access to the locked object data as the structure of the object is being changed. SQL Server allows a single schema modification lock (SCH-M) lock on any locked object. The schema stability lock (SCH-S) is acquired while a schema-dependent query is being compiled and executed and execution plan is generated. This lock does not block other transactions to access the object data.

With regard to SCH-A (access a schema version) and SCH-C (create a schema version), embodiments may support and/or enforce various types of constraints or functionality such as:

1. Not all DDL operations may support metadata versioning

2. No concurrent DDL operations (i.e., only one DDL operation per object at a time) regardless of whether the operation is one that supports versioning.

2. Data manipulation language ("DML") operations such as, e.g., insert, update, delete or merge, are not allowed while schema changes are in progress i.e., no DML operation while there are pending (uncommitted) DDL changes.

3. Snapshot queries under snapshot isolation or read committed snapshot isolation are allowed while there are ongoing DDL operations. Other isolation levels are blocked.

4. Some operations cannot or will not support versioning and should block even snapshot queries. Such operations may include, for example, DBCC SHRINK. During DBCC SHRINK, operation affects physical structure of the index such as when moving index allocation map ("IAM") pages. As such, a SCH-M lock is acquired. Furthermore, a subset of DDL operations (mainly add column, remove column) may be supported and work incrementally. In an embodiment, any un-supported DDL operations (such as rename column etc.) may maintain the old blocking semantics.

How the New Lock Modes Interact with Existing Schema Locks:

SCH-A: Indicates that the query requires schema stability using versioning. SCH-A is acquired by snapshot queries that currently take SCH-S and conflicts with SCH-M lock that will still be acquired by all DDL operations that don't support versioning.

SCH-C: Indicates a versioned schema modification and is acquired by DDL operations that support schema versioning, for example ADD COLUMN. This is less restrictive than SCH-M in the sense that it is compatible with SCH-A, but still incompatible with SCH-S.

The lock modes regarding schema changes and stability may include the following, starting from the least to the most exclusive:

SCH-A: Acquired by snapshot queries that used to take SCH-S i.e., all SI will take SCH-A lock.

SCH-S: Acquired by all other operations that use it today, such as NOLOCK scans, etc.

Note that even though SCH-A may be considered the weakest lock (in new locking schema), SCH-S is still acquired for NOLOCK table scan to prevent schema changes while the scan is in progress. Data access locks, such as IS, IX, etc. are still used by other isolation levels, such as Read Committed, etc. SCH-C: Acquired by the DDL operations that support versioning but enables snapshot queries that now use SCH-A. SCH-M: Acquired by non-versioned DDL operations and blocks everything such as DBCC shrink, etc.

A compatibility matrix (C—Conflict, N—No conflict) is shown below as Table 1 for snapshot queries:

TABLE 1

| | Granted Mode | | | | |
|---|---|---|---|---|---|
| Requested Mode | SCH-S | SCH-M | SCH-A | SCH-C | S/U/X/IS/IU/IX |
| SCH-S | N | C | N | C | N |
| SCH-M | C | C | C | C | C |
| SCH-A | N | C | N | N | N |
| SCH-C | C | C | N | C | C |
| S/U/X/IS/IU/IX | N | C | N | C | various |

Further changes may include:
1. In storage engine, acquire SCH-S when accessing HoBt (Heap or B-tree) metadata. With metadata versioning, switch snapshot access calls from SCH-S to SCH-A.
2. Similarly for system table level snapshot access, acquire SCH-A instead of SCH-S lock.
3. For query compilation, use RCSI semantics and use SCH-A lock instead of SCH-S. During execution time if the user transaction is not running at SI/RCSI level, then may recompile the query based on current object version.

FIGS. 5A, 5B, 5C and 6 which depict flowcharts 500, 510, 530 and 600, respectively, of example methods of operating a relational database system to modify a metadata object without being blocked by a concurrent read access of the metadata object, according to an embodiment. Flowcharts 500, 510, 530 and 600 illustrate methods that are analogous to the snapshot isolation and read committed snapshot isolation scenarios described herein above with regard to example logical timelines 300 and 400 of FIGS. 3 and 4, respectively. In an embodiment, flowcharts 500, 510, 530 and 600 may be performed by relational database system 100 of FIG. 1. Although described with reference to system 100 as shown in FIG. 1 and logical timeline 300 of FIG. 3, flowcharts 500, 510, 530 and 600 are not limited to that implementation. Other structural and operational embodiments will be apparent to persons skilled in the relevant art(s) based on the following discussion flowcharts 500, 510, 530 and 600 of FIGS. 5A, 5B, 5C and 6, respectively.

Figure 5A:
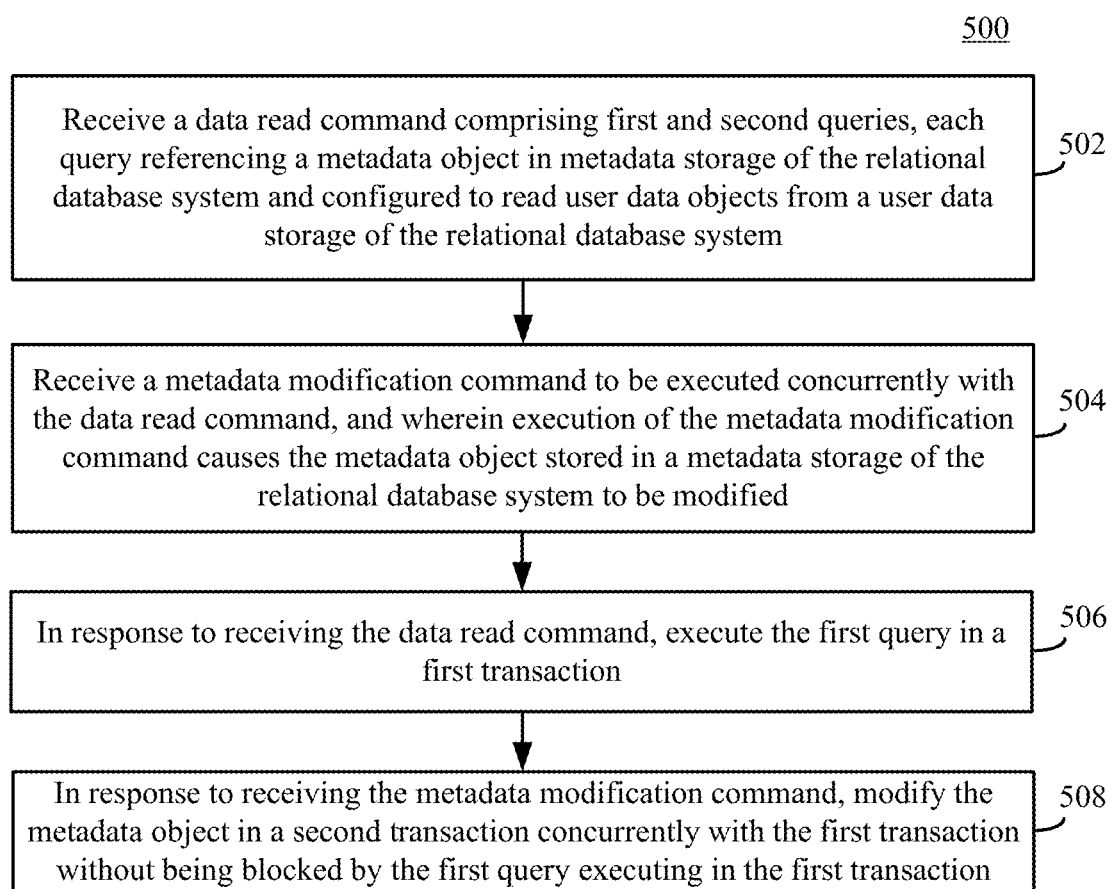
FIG. 5A depicts a flowchart of an example method of operating a relational database system to modify a metadata object without being blocked by a concurrent read access of the metadata object, according to an example embodiment.

As shown in FIG. 5A, flowchart 500 begins with step 502. In step 502, a data read command is received that includes first and second queries, each query referencing a metadata object in metadata storage of the relational database system and configured to read user data objects from a user data storage of the relational database system. For example, client 104 of may send a read command to relational database system 100 as shown in FIG. 1. More specifically, client 104 may send data read command 308 or 408 as shown in FIGS. 3 and 4, respectively, which is received by parser 110 within execution environment 108. Data read command 308 and 408 each include first and second queries in the form of the SELECT statements directed at the Employees table that begin executing at time T2 and T10, respectively. Processing such queries within execution environment 108 requires that the metadata objects necessarily reference the metadata that corresponds to the Employees table. Flowchart 500 continues at step 504.

In step 504, a metadata modification command is received to be executed concurrently with the data read command, and wherein execution of the metadata modification command causes the metadata object stored in a metadata storage of the relational database system to be modified. For example, and with continued reference to FIGS. 1, 3 and 4, client 106 may send metadata modification command 302 or 402 as shown in FIG. 3 or 4, respectively, which is received by parser 110 within execution environment 108. Metadata modification command 302 and 402 include an ALTER TABLE command that begins executing at time T6 or T5, respectively, and which adds a RemainingSickDays column to the Employees table. Processing such the ALTER modifies the metadata that corresponds to the Employees table. Flowchart 500 continues at step 506.

In step 506, in response to receiving the data read command, the first query is executed in a first transaction. With continued reference to FIGS. 1, 3 and 4, data read command 308 or 408 executes each of the first and second queries within a transaction that begins at time T1 and commits at time T12 or T13, respectively. Flowchart 500 concludes at step 508.

In step 508, in response to receiving the metadata modification command, the metadata object is modified in a second transaction concurrently with the first transaction without being blocked by the first query executing in the first transaction. With continued reference to FIGS. 3 and 4, the ALTER TABLE command that begins executing at time T6 or T5, respectively, executes within a transaction that begins at time T4 or T5, respectively, and commits at time T9 or T11, respectively. Data read command 308 and 408 each obtains and uses a schema access lock SCH-A as denoted in column lock type 310 or 410 of FIGS. 3 and 4, respectively. The ALTER TABLE command obtains and uses a schema change lock SCH-C as denoted in column lock type 304 and 404 of FIGS. 3 and 4, respectively. As described herein above, the SCH-A lock does not block the SCH-C lock and the ALTER TABLE may execute concurrently with the queries being executed by data read command 308.

In the foregoing discussion of steps 502-508 of flowchart 500, it should be understood that at times, such steps may be performed in a different order or even contemporaneously with other steps. For example, the SELECT statement that begins executing at time T2 could begin executing at a different time. Other operational embodiments will be apparent to persons skilled in the relevant art(s). Note also that the foregoing general description of the operation of relational database system 100 is provided for illustration only, and embodiments of relational database system 100 may comprise different hardware and/or software, and may operate in manners different than described above. Indeed, steps of flowchart 500 may be performed in various ways.

Figure 5B:
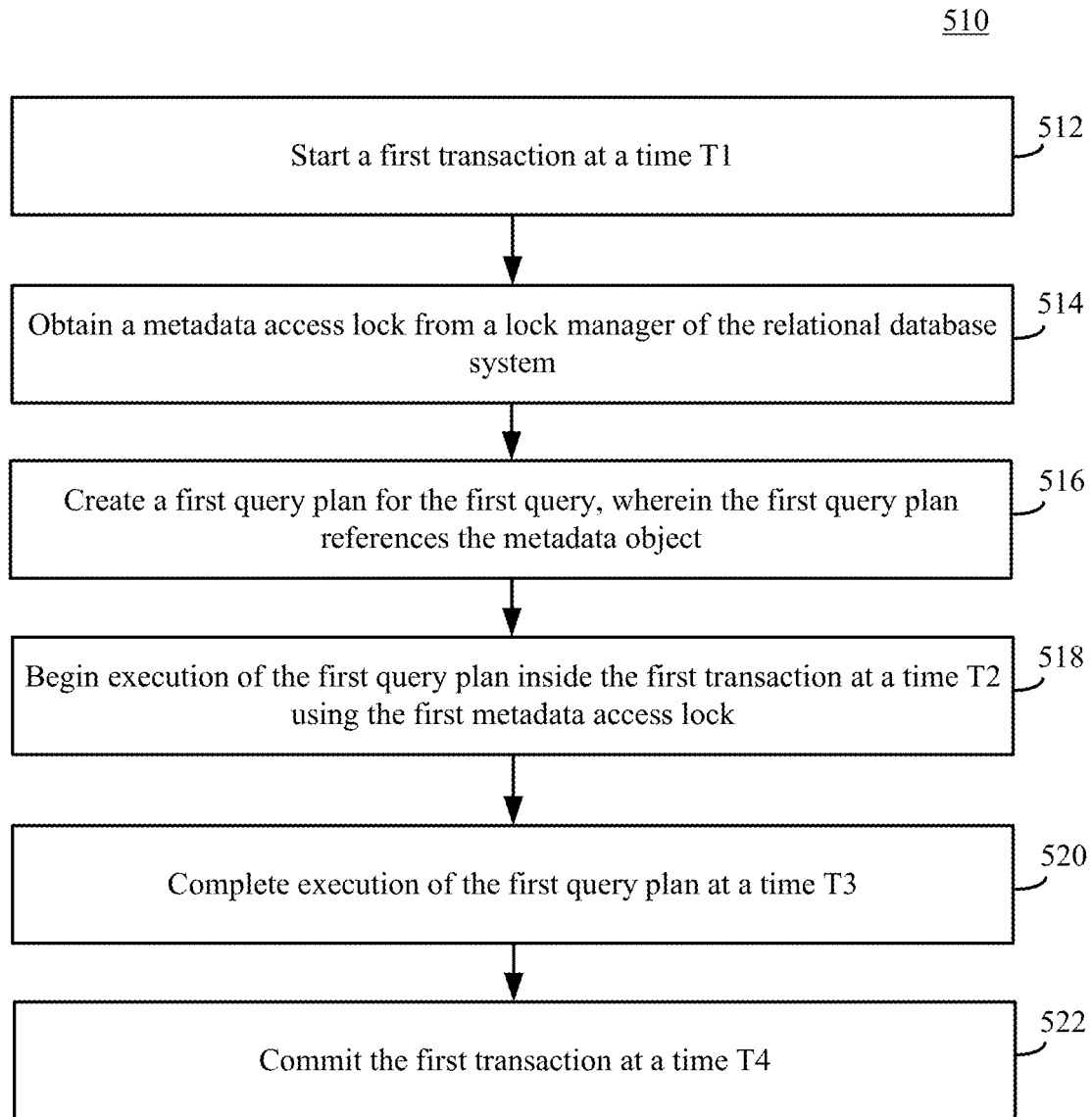
FIG. 5B depicts a flowchart of a refinement to the method depicted in FIG. 5A, according to an embodiment.

For example, FIG. 5B depicts a flowchart 510 of an example method of operating a relational database system to modify a metadata object without being blocked by a concurrent read access of the metadata object, according to an embodiment, and wherein flowchart 510 comprises refinements or additions to the method steps of flowchart 500 as depicted in FIG. 5A. Accordingly, flowchart 510 of FIG. 5B will also be described with continued reference to relational database system 100 of FIG. 1 and FIGS. 3 and 4. However, other structural and operational embodiments will be apparent to persons skilled in the relevant art(s) based on the following discussion regarding flowchart 510.

As shown in FIG. 5B, flowchart 510 begins with step 512. In step 512, a first transaction is started at a time T1. For example, and with reference to timeline 300 of FIG. 3, data read command 308 starts a transaction at a time T1 on the timeline denoted in time column 306. Flowchart 510 continues at step 514.

In step 514, a metadata access lock is obtained from a lock manager of the relational database system. For example, The SELECT statement of data read command 308 that begins executing at time T2 on the timeline denoted in time column 306 obtains a SCH-A lock from lock manager 124 within execution environment 108 of relational database system 100 as described further herein. Flowchart 510 continues at step 516.

In step 516, a first query plan is created for the first query, wherein the first query plan references the metadata object. With reference to FIG. 1, when data read command 308 is processed within execution environment 108, parser 110 in conjunction with binding/algebrizer/query optimizer 112 will cause a query plan to be created that references the proper metadata objects that correspond to the snapshot created when transaction begins. More specifically, a query plan for the SELECT statement of data read command 308 that begins executing at time T2 on the timeline denoted in time column 306 will reference the metadata for the Employees table that exists in the snapshot created a time T1 when the transaction begins. Flowchart 510 continues at step 518.

In step 518, execution of the first query plan is begun inside the first transaction at a time T2 using the first metadata access lock. For example, the query plan for the SELECT statement of data read command 308 that begins executing at time T2 on the timeline denoted in time column 306 is submitted to query execution engine 120 as depicted in FIG. 1, and such query plan begins executing. Flowchart 510 concludes at step 516.

In step 520, execution of the first query plan is completed at a time T3. With continued reference to FIG. 3, the SELECT statement of data read command 308 that begins executing at time T2 on the timeline denoted in time column 306 completes execution at time T9 as shown on the timeline denoted in time column 306. Thus, the time T3 corresponds to the time T9 as shown on the timeline denoted in time column 306.

In step 522, the first transaction is committed at a time T4. For example, the transaction that begun at time T1 on the timeline denoted in time column 306 commits at time T12 on that same timeline. Thus, the time T4 in this example, is the time T12 on the timeline denoted in time column 306.

In the foregoing discussion of steps 512-522 of flowchart 510, it should be understood that at times, such steps may be performed in a different order or even contemporaneously with other steps. For example, the SELECT statement that begins executing at time T2 could begin executing at a different time. Other operational embodiments will be apparent to persons skilled in the relevant art(s). Note also that the foregoing general description of the operation of relational database system 100 is provided for illustration only, and embodiments of relational database system 100 may comprise different hardware and/or software, and may operate in manners different than described above.

Figure 5C:
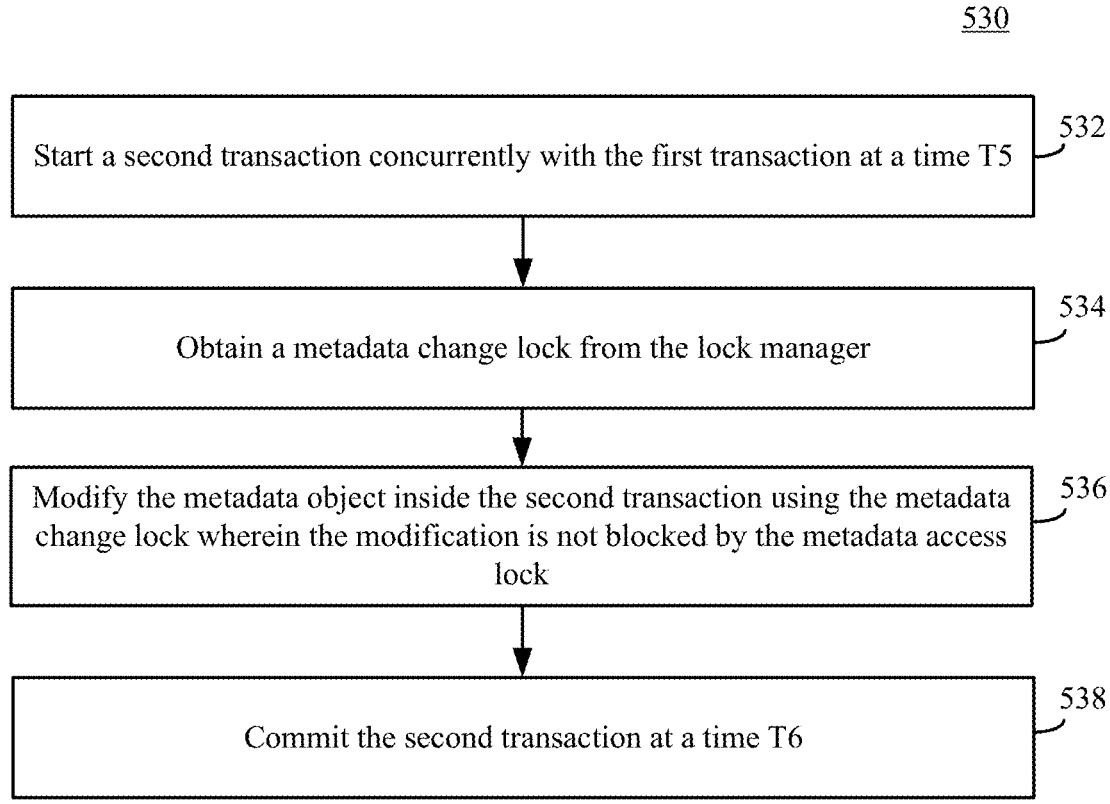
FIG. 5C depicts a flowchart of a refinement to the method depicted in FIGS. 5A and 5B, according to an embodiment.

FIG. 5C depicts a flowchart 530 that is a refinement to the method depicted in FIGS. 5A and 5B, according to an embodiment. Accordingly, flowchart 530 of FIG. 5B is also described with continued reference to relational database system 100 of FIG. 1 and FIGS. 3 and 4. However, other structural and operational embodiments will be apparent to persons skilled in the relevant art(s) based on the following discussion regarding flowchart 530.

As shown in FIG. 5C, flowchart 530 begins with step 532. In step 532, a second transaction is started concurrently with the first transaction at a time T5. For example, and with reference to timeline 300 of FIG. 3, metadata modification command 302 includes a transaction that begins at time T4 as denoted on the timeline denoted in time column 306. Thus, the time T5 in flowchart 530 may correspond, for example, to time T4 as denoted on the timeline denoted in time column 306. Flowchart 530 continues with step 534.

In step 534, a metadata change lock is obtained from the lock manager. For example, The ALTER TABLE statement of metadata modification command 302 that begins executing at time T6 on the timeline denoted in time column 306 obtains a SCH-C lock from lock manager 124 within execution environment 108 of relational database system 100 as described further herein above. Flowchart 530 continues at step 536.

In step 536, the metadata object is modified inside the second transaction using the metadata change lock wherein the modification is not blocked by the metadata access lock. With continued reference to FIG. 3, the ALTER TABLE command that begins executing at time T6 obtains a SCH-C lock whereas data read command 308 obtains and uses a schema access lock SCH-A as denoted in column lock type 310 of FIG. 3. As described herein above, the SCH-A lock does not block the SCH-C lock and the ALTER TABLE may execute concurrently with the queries being executed by data read command 308. Flowchart 530 concludes at step 538.

In step 538, the second transaction is committed at a time T6. With continued reference to FIG. 3, the ALTER TABLE command that begins executing at time T6 executes within a transaction that begins at time T4 and commits at time T9. Thus, the time T6 corresponds to the time T9 as denoted on the timeline denoted in time column 306.

In the foregoing discussion of steps 532-538 of flowchart 530, it should be understood that at times, such steps may be performed in a different order or even contemporaneously with other steps. Other operational embodiments will be apparent to persons skilled in the relevant art(s). Note also that the foregoing general description of the operation of relational database system 100 is provided for illustration only, and embodiments of relational database system 100 may comprise different hardware and/or software, and may operate in manners different than described above. Indeed, steps of flowcharts 500, 510 and 530 may be performed in various ways.

Figure 6:
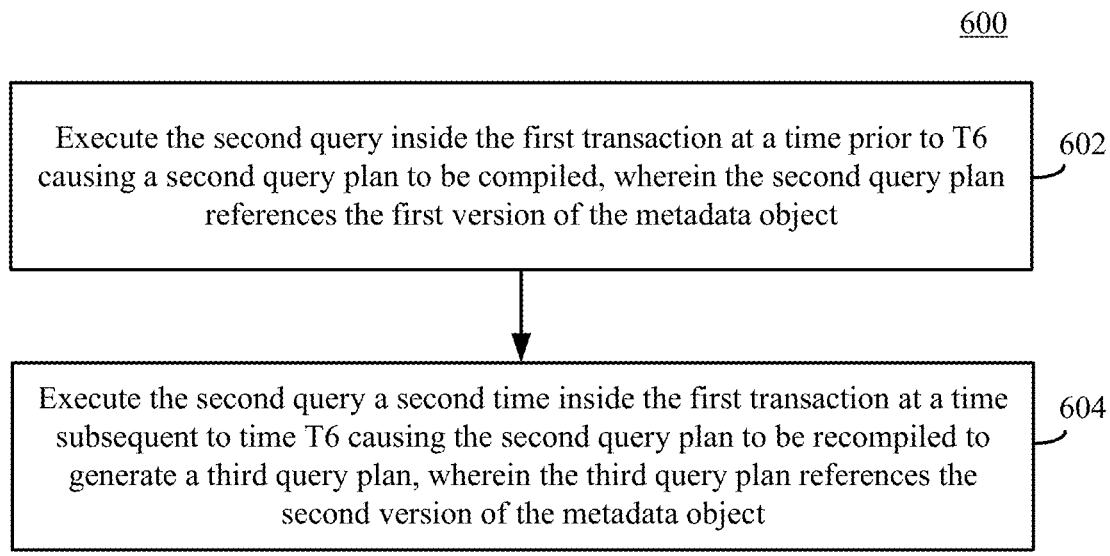
FIG. 6 depicts a flowchart of a refinement to the methods depicted in FIGS. 5A, 5B and 5C for triggering query plan recompilation in a snapshot isolation mode, according to an embodiment.

For example, flowchart 600 of FIG. 6 illustrates an example refinement to flowcharts 500, 510 and/or 530 wherein embodiments operate in a read committed snapshot isolation mode. In such a mode, metadata object version visibility and new snapshot creation is performed on for each command within a transaction rather than being scoped entirely to a transaction. Flowchart 600 begins with step 602. In step 602, the second query is executed inside the first transaction at a time prior to T6 causing a second query plan to be compiled, wherein the second query plan references the first version of the metadata object. For example, and with reference to FIG. 4, data read command 408 includes a first SELECT statement that begins executing at time T2 as shown in time column 406. That query will cause a query plan to be created for its execution. Likewise, the SELECT statement of data read command 408 that begins executing at time T10 as shown in time column 406 will cause a different query plan to be created since the query is different. In each case, the transaction of metadata modification command 402 is NOT completed when such SELECT statements begin to execute. Accordingly, such queries will see a snapshot that references the version of the metadata of the Employees table that existed when such SELECT statements started. Flowchart 600 concludes at step 604.

In step 604, the second query is executed a second time inside the first transaction at a time subsequent to time T6 causing the second query plan to be recompiled to generate a third query plan, wherein the third query plan references the second version of the metadata object. With continued reference to FIG. 4, the SELECT statement that begins executing at time T10 is executed again at time T12. However, because metadata modification command 402 transaction committed at time T11, the SELECT statement executing at time T12 cannot use the same query plan because that query plan references an old version of the metadata corresponding to the Employees table. Instead, embodiments will create a new snapshot that references the second version of the metadata for the Employees table wherein the new RemainingSickDays column is in fact visible.

The scenario described in flowchart 600 is not applicable where embodiments are operating in the snapshot isolation mode such as depicted by example timeline 300 of FIG. 3. In that instance, and as described above, the visibility of metadata modifications is always scoped to the transaction level rather than the statement level within a transaction. Accordingly, every statement that executes within, for example, the transaction that begins at time T1 as shown in time column 306 of FIG. 3 will see the metadata version that existed at the time the transaction starts even though a concurrently executed metadata modification command may execute and commit before for data read command transaction commits.

In the foregoing discussion of the steps of flowcharts 500, 510, 530 and 600, it should be understood that at times, such steps may be performed in a different order or even contemporaneously with other steps. Note also that the foregoing general description of the operation of relational database system 100 is provided for illustration only, and embodiments of relational database system 100 may comprise different hardware and/or software, and may operate in manners different than described above.

III. Example Computer System Implementation

Each of relational database system 100, client 104, client 106, binding/algebrizer/query optimizer 112, parser 110, lock manager 124, metadata storage 114, metadata cache 116, data storage engine 118, query execution engine 120, and/or transaction manager 122, and flowchart 500, 510 and/or 530 may be implemented in hardware, or hardware combined with software and/or firmware. For example, relational database system 100, client 104, client 106, binding/algebrizer/query optimizer 112, parser 110, lock manager 124, metadata storage 114, metadata cache 116, data storage engine 118, query execution engine 120, and/or transaction manager 122, and flowchart 500, 510 and/or 530 may be implemented as computer program code/instructions configured to be executed in one or more processors and stored in a computer readable storage medium. Alternatively, relational database system 100, client 104, client 106, binding/algebrizer/query optimizer 112, parser 110, lock manager 124, metadata storage 114, metadata cache 116, data storage engine 118, query execution engine 120, and/or transaction manager 122, and flowchart 500, 510, 530, and/or 600 may be implemented as hardware logic/electrical circuitry.

For instance, in an embodiment, one or more, in any combination, of relational database system 100, client 104, client 106, binding/algebrizer/query optimizer 112, parser 110, lock manager 124, metadata storage 114, metadata cache 116, data storage engine 118, query execution engine 120, and/or transaction manager 122, and flowchart 500, 510 and/or 530 may be implemented together in a SoC. The SoC may include an integrated circuit chip that includes one or more of a processor (e.g., a central processing unit (CPU), microcontroller, microprocessor, digital signal processor (DSP), one or more graphics processing units (GPUs), etc.), memory, one or more communication interfaces, and/or further circuits, and may optionally execute received program code and/or include embedded firmware to perform functions.

Figure 7:
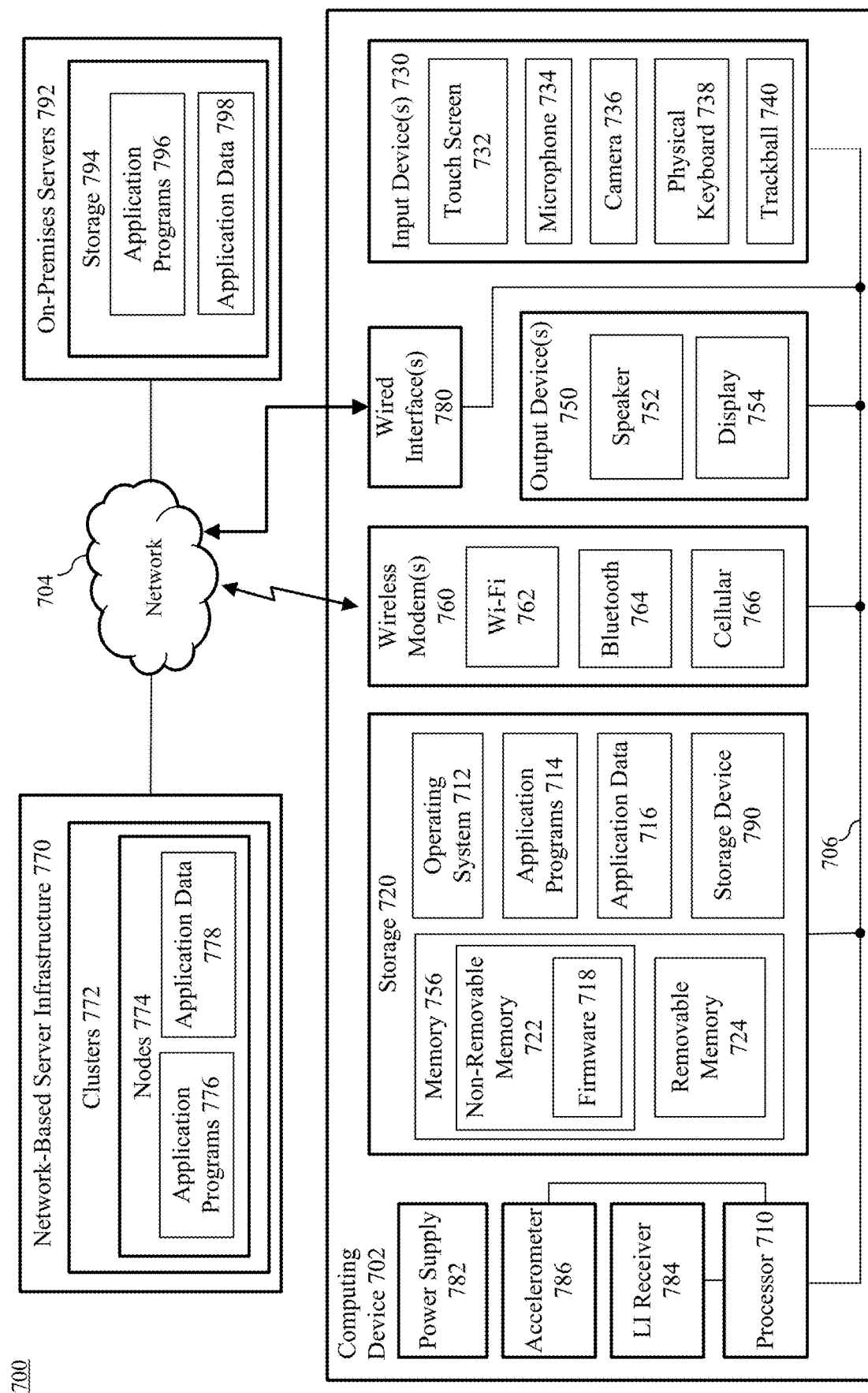
FIG. 7 is a block diagram of an example computer system in which embodiments may be implemented.

FIG. 7 depicts an exemplary implementation of a computing device 700 in which embodiments may be implemented. For example, relational database system 100, client 104, client 106, binding/algebrizer/query optimizer 112, parser 110, lock manager 124, metadata storage 114, metadata cache 116, data storage engine 118, query execution engine 120, and/or transaction manager 122 may be implemented in one or more computing devices similar to computing device 700 in stationary or mobile computer embodiments, including one or more features of computing device 700 and/or alternative features. The description of computing device 700 provided herein is provided for purposes of illustration, and is not intended to be limiting. Embodiments may be implemented in further types of computer systems, as would be known to persons skilled in the relevant art(s).

Computing device 702 can be any of a variety of types of computing devices. For example, computing device 702 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 702 may alternatively be a stationary computing device such as a desktop computer, a personal computer (PC), a stationary server device, a minicomputer, a mainframe, a supercomputer, etc.

As shown in FIG. 7, computing device 702 includes a variety of hardware and software components, including a processor 710, a storage 720, one or more input devices 730, one or more output devices 750, one or more wireless modems 760, one or more wired interfaces 780, a power supply 782, a location information (LI) receiver 784, and an accelerometer 786. Storage 720 includes memory 756, which includes non-removable memory 722 and removable memory 724, and a storage device 790. Storage 720 also stores an operating system 712, application programs 714, and application data 716. Wireless modem(s) 760 include a Wi-Fi modem 762, a Bluetooth modem 764, and a cellular modem 766. Output device(s) 750 includes a speaker 752 and a display 754. Input device(s) 730 includes a touch screen 732, a microphone 734, a camera 736, a physical keyboard 738, and a trackball 740. Not all components of computing device 702 shown in FIG. 7 are present in all embodiments, additional components not shown may be present, and any combination of the components may be present in a particular embodiment. These components of computing device 702 are described as follows.

A single processor 710 (e.g., central processing unit (CPU), microcontroller, a microprocessor, signal processor, ASIC (application specific integrated circuit), and/or other physical hardware processor circuit) or multiple processors 710 may be present in computing device 702 for performing such tasks as program execution, signal coding, data processing, input/output processing, power control, and/or other functions. Processor 710 may be a single-core or multi-core processor, and each processor core may be single-threaded or multithreaded (to provide multiple threads of execution concurrently). Processor 710 is configured to execute program code stored in a computer readable medium, such as program code of operating system 712 and application programs 714 stored in storage 720. Operating system 712 controls the allocation and usage of the components of computing device 702 and provides support for one or more application programs 714 (also referred to as "applications" or "apps"). Application programs 714 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 702 can communicate with any other component according to function, although not all connections are shown for ease of illustration. For instance, as shown in FIG. 7, bus 706 is a multiple signal line communication medium (e.g., conductive traces in silicon, metal traces along a motherboard, wires, etc.) that may be present to communicatively couple processor 710 to various other components of computing device 702, although in other embodiments, an alternative bus, further buses, and/or one or more individual signal lines may be present to communicatively couple components. Bus 706 represents one or more of any of several types of bus structures, including a memory bus or memory controller, a peripheral bus, an accelerated graphics port, and a processor or local bus using any of a variety of bus architectures.

Storage 720 is physical storage that includes one or both of memory 756 and storage device 790, which store operating system 712, application programs 714, and application data 716 according to any distribution. Non-removable memory 722 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 722 may include main memory and may be separate from or fabricated in a same integrated circuit as processor 710. As shown in FIG. 7, non-removable memory 722 stores firmware 718, which may be present to provide low-level control of hardware. Examples of firmware 718 include BIOS (Basic Input/Output System, such as on personal computers) and boot firmware (e.g., on smart phones). Removable memory 724 may be inserted into a receptacle of or otherwise coupled to computing device 702 and can be removed by a user from computing device 702. Removable memory 724 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 790 may be present that are internal and/or external to a housing of computing device 702 and may or may not be removable. Examples of storage device 790 include a hard disk drive, a SSD, a thumb drive (e.g., a USB (Universal Serial Bus) flash drive), or other physical storage device.

One or more programs may be stored in storage 720. Such programs include operating system 712, one or more application programs 714, and other program modules and program data. Examples of such application programs may include, for example, computer program logic (e.g., computer program code/instructions) for implementing one or more of relational database system 100, client 104, client 106, binding/algebrizer/query optimizer 112, parser 110, lock manager 124, metadata storage 114, metadata cache 116, data storage engine 118, query execution engine 120, and/or transaction manager 122, and flowchart 500, 510, 530, and/or 600 (including any suitable step of flowchart 500, 510, 530 and/or 600), and/or further embodiments described herein.

Storage 720 also stores data used and/or generated by operating system 712 and application programs 714 as application data 716. Examples of application data 716 include web pages, text, images, tables, sound files, video data, and other data, which may also be sent to and/or received from one or more network servers or other devices via one or more wired or wireless networks. Storage 720 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 702 through one or more input devices 730 and may receive information from computing device 702 through one or more output devices 750. Input device(s) 730 may include one or more of touch screen 732, microphone 734, camera 736, physical keyboard 738 and/or trackball 740 and output device(s) 750 may include one or more of speaker 752 and display 754. Each of input device(s) 730 and output device(s) 750 may be integral to computing device 702 (e.g., built into a housing of computing device 702) or external to computing device 702 (e.g., communicatively coupled wired or wirelessly to computing device 702 via wired interface(s) 780 and/or wireless modem(s) 760). Further input devices 730 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 754 may display information, as well as operating as touch screen 732 by receiving user commands and/or other information (e.g., by touch, finger gestures, virtual keyboard, etc.) as a user interface. Any number of each type of input device(s) 730 and output device(s) 750 may be present, including multiple microphones 734, multiple cameras 736, multiple speakers 752, and/or multiple displays 754.

One or more wireless modems 760 can be coupled to antenna(s) (not shown) of computing device 702 and can support two-way communications between processor 710 and devices external to computing device 702 through network 704, as would be understood to persons skilled in the relevant art(s). Wireless modem 760 is shown generically and can include a cellular modem 766 for communicating with one or more cellular networks, such as a GSM network for data and voice communications within a single cellular network, between cellular networks, or between the mobile device and a public switched telephone network (PSTN). Wireless modem 760 may also or alternatively include other radio-based modem types, such as a Bluetooth modem 764 (also referred to as a "Bluetooth device") and/or Wi-Fi 762 modem (also referred to as an "wireless adaptor"). Wi-Fi modem 762 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 764 is configured to communicate with another Bluetooth-capable device according to the Bluetooth short-range wireless technology standard(s) such as IEEE 802.15.1 and/or managed by the Bluetooth Special Interest Group (SIG).

Computing device 702 can further include power supply 782, LI receiver 784, accelerometer 786, and/or one or more wired interfaces 780. Example wired interfaces 780 include a USB port, IEEE 794 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 780 of computing device 702 provide for wired connections between computing device 702 and network 704, or between computing device 702 and one or more devices/peripherals when such devices/peripherals are external to computing device 702 (e.g., a pointing device, display 754, speaker 752, camera 736, physical keyboard 738, etc.). Power supply 782 is configured to supply power to each of the components of computing device 702 and may receive power from a battery internal to computing device 702, and/or from a power cord plugged into a power port of computing device 702 (e.g., a USB port, an A/C power port). LI receiver 784 may be used for location determination of computing device 702 and may include a satellite navigation receiver such as a Global Positioning System (GPS) receiver or may include other type of location determiner configured to determine location of computing device 702 based on received information (e.g., using cell tower triangulation, etc.). Accelerometer 786 may be present to determine an orientation of computing device 702.

Note that the illustrated components of computing device 702 are not required or all-inclusive, and fewer or greater numbers of components may be present as would be recognized by one skilled in the art. For example, computing device 702 may also include one or more of a gyroscope, barometer, proximity sensor, ambient light sensor, digital compass, etc. Processor 710 and memory 756 may be co-located in a same semiconductor device package, such as being included together in an integrated circuit chip, FPGA, or system-on-chip (SOC), optionally along with further components of computing device 702.

In embodiments, computing device 702 is configured to implement any of the above-described features of flowcharts herein. Computer program logic for performing any of the operations, steps, and/or functions described herein may be stored in storage 720 and executed by processor 710.

In some embodiments, server infrastructure 770 may be present in computing environment 700 and may be communicatively coupled with computing device 702 via network 704. Server infrastructure 770, when present, may be a network-accessible server set (e.g., a cloud-based environment or platform). As shown in FIG. 7, server infrastructure 770 includes clusters 772. Each of clusters 772 may comprise a group of one or more compute nodes and/or a group of one or more storage nodes. For example, as shown in FIG. 7, cluster 772 includes nodes 774. Each of nodes 774 are accessible via network 704 (e.g., in a "cloud-based" embodiment) to build, deploy, and manage applications and services. Any of nodes 774 may be a storage node that comprises a plurality of physical storage disks, SSDs, and/or other physical storage devices that are accessible via network 704 and are configured to store data associated with the applications and services managed by nodes 774. For example, as shown in FIG. 7, nodes 774 may store application data 778.

Each of nodes 774 may, as a compute node, comprise one or more server computers, server systems, and/or computing devices. For instance, a node 774 may include one or more of the components of computing device 702 disclosed herein. Each of nodes 774 may be configured to execute one or more software applications (or "applications") and/or services and/or manage hardware resources (e.g., processors, memory, etc.), which may be utilized by users (e.g., customers) of the network-accessible server set. For example, as shown in FIG. 7, nodes 774 may operate application programs 776. In an implementation, a node of nodes 774 may operate or comprise one or more virtual machines, with each virtual machine emulating a system architecture (e.g., an operating system), in an isolated manner, upon which applications such as application programs 776 may be executed.

In an embodiment, one or more of clusters 772 may be co-located (e.g., housed in one or more nearby buildings with associated components such as backup power supplies, redundant data communications, environmental controls, etc.) to form a data center, or may be arranged in other manners. Accordingly, in an embodiment, one or more of clusters 772 may be a data center in a distributed collection of data centers. In embodiments, exemplary computing environment 700 comprises part of a cloud-based platform such as Amazon Web Services® of Amazon Web Services, Inc., or Google Cloud Platform™ of Google LLC, although these are only examples and are not intended to be limiting.

In an embodiment, computing device 702 may access application programs 776 for execution in any manner, such as by a client application and/or a browser at computing device 702. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 702 may additionally and/or alternatively synchronize copies of application programs 714 and/or application data 716 to be stored at network-based server infrastructure 770 as application programs 776 and/or application data 778. For instance, operating system 712 and/or application programs 714 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 720 at network-based server infrastructure 770.

In some embodiments, on-premises servers 792 may be present in computing environment 700 and may be communicatively coupled with computing device 702 via network 704. On-premises servers 792, when present, are hosted within an organization's infrastructure and, in many cases, physically onsite of a facility of that organization. On-premises servers 792 are controlled, administered, and maintained by IT (Information Technology) personnel of the organization or an IT partner to the organization. Application data 798 may be shared by on-premises servers 792 between computing devices of the organization, including computing device 702 (when part of an organization) through a local network of the organization, and/or through further networks accessible to the organization (including the Internet). Furthermore, on-premises servers 792 may serve applications such as application programs 796 to the computing devices of the organization, including computing device 702. Accordingly, on-premises servers 792 may include storage 794 (which includes one or more physical storage devices such as storage disks and/or SSDs) for storage of application programs 796 and application data 798 and may include one or more processors for execution of application programs 796. Still further, computing device 702 may be configured to synchronize copies of application programs 714 and/or application data 716 for backup storage at on-premises servers 792 as application programs 796 and/or application data 798.

Embodiments described herein may be implemented in one or more of computing device 702, network-based server infrastructure 770, and on-premises servers 792. For example, in some embodiments, computing device 702 may be used to implement systems, clients, or devices, or components/subcomponents thereof, disclosed elsewhere herein. In other embodiments, a combination of computing device 702, network-based server infrastructure 770, and/or on-premises servers 792 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 720. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 714) may be stored in storage 720. Such computer programs may also be received via wired interface(s) 780 and/or wireless modem(s) 760 over network 704. Such computer programs, when executed or loaded by an application, enable computing device 702 to implement features of embodiments discussed herein. Accordingly, such computer programs represent controllers of the computing device 702.

Embodiments are also directed to computer program products comprising computer code or instructions stored on any computer-readable medium or computer-readable storage medium. Such computer program products include the physical storage of storage 720 as well as further physical storage types.

IV. Additional Example Embodiments

As described, systems and devices embodying the techniques herein may be configured and enabled in various ways to perform their respective functions for enabling metadata and data modification concurrency a relational database system. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As described herein, systems, devices, components, etc., of the embodiments that are configured to perform functions and/or operations are also contemplated as performing such functions and/or operations.

The additional examples and embodiments described in this Section may be applicable to examples disclosed in any other Section or subsection of this disclosure.

A relational database system is provided herein. The relational database system comprising: a metadata version aware execution engine configured to: receive a data read command comprising first and second queries, each query referencing a metadata object in metadata storage of the relational database system and configured to read user data objects from a user data storage of the relational database system; receive a metadata modification command to be executed concurrently with the data read command, and wherein execution of the metadata modification command causes the metadata object stored in a metadata storage of the relational database system to be modified; in response to receiving the data read command: start a first transaction at a time T1; obtain a metadata access lock from a lock manager of the relational database system; create a first query plan for the first query, wherein the first query plan references the metadata object; begin execution of the first query plan inside the first transaction at a time T2 using the metadata access lock; complete execution of the first query plan at a time T3; and commit the first transaction at a time T4; and in response to receiving the metadata modification command: start a second transaction concurrently with the first transaction at a time T5; obtain a metadata change lock from the lock manager; modify the metadata object inside the second transaction using the metadata change lock, wherein the modification is not blocked by the metadata access lock; and commit the second transaction at a time T6.

In another embodiment of the relational database system, time T2 is subsequent to time T1, time T5 is subsequent to time T2, time T3 is subsequent to time T5 and time T6 is subsequent to time T3.

In another embodiment of the relational database system, prior to executing the metadata modification command, the metadata object comprises a first version of the metadata object.

In another embodiment of the relational database system, executing the metadata modification command causes the first version of the metadata object to be modified into a second version of the metadata object.

In another embodiment of the relational database system, wherein the execution engine is configured to operate in a read committed snapshot isolation mode to: execute the second query inside the first transaction at a time prior to T6 causing a second query plan to be compiled, wherein the second query plan references the first version of the metadata object; and execute the second query a second time inside the first transaction at a time subsequent to time T6 causing the second query plan to be recompiled to generate a third query plan, wherein the third query plan references the second version of the metadata object.

In another embodiment of the relational database system, wherein the execution engine is configured to operate in a regular snapshot isolation mode to: execute the second query inside the first transaction at a time either prior to or subsequent to time T6 causes a second query plan to be compiled wherein the second query plan references the first version of the metadata object; and execute the second query a second time inside the first transaction at a time subsequent to time T6 reusing the second query plan, wherein the query plan references the first version of the metadata object.

In another embodiment of the relational database system, the relational database system further comprises a transaction manager configured to determine which of the first or second version of the metadata object is visible to a transaction at a predetermined time.

In another embodiment of the relational database system, the transaction manager is further configured to determine which of the first or second version of the metadata object is visible to a transaction at a predetermined time based at least in part on whether the execution engine is configured to operate in a first snapshot isolation mode, a second snapshot isolation mode or a non-snapshot isolation mode.

A method in a relational database system is provided herein. The method comprising: receiving a data read command comprising first and second queries, each query referencing a metadata object in a metadata storage of the relational database system and configured to read user data objects from a user data storage of the relational database system; receiving a metadata modification command to be executed concurrently with the data read command, and wherein execution of the metadata modification command causes the metadata object to be modified; in response to receiving the data read command: starting a first transaction at a time T1; obtaining a metadata access lock from a lock manager of the relational database system; creating a first query plan for the first query, wherein the first query plan references the metadata object; beginning execution of the first query plan inside the first transaction at a time T2 using the metadata access lock; completing execution of the first query plan at a time T3; and committing the first transaction at a time T4; and in response to receiving the metadata modification command: starting a second transaction concurrently with the first transaction at a time T5; obtaining a metadata change lock from the lock manager; modifying the metadata object inside the second transaction using the metadata change lock, wherein the modification is not blocked by the metadata access lock; and committing the second transaction at a time T6.

In another embodiment of the foregoing method, time T2 is subsequent to time T1, time T5 is subsequent to time T2, time T3 is subsequent to time T5 and time T6 is subsequent to time T3.

In another embodiment of the foregoing method, prior to executing the metadata modification command, the metadata object comprises a first version of the metadata object.

In another embodiment of the foregoing method, executing the metadata modification command causes the first version of the metadata object to be modified into a second version of the metadata object.

In another embodiment of the foregoing method, the method further comprises operating the relational database system in a first snapshot isolation mode and: executing the second query inside the first transaction at a time prior to T6 causing a second query plan to be compiled, wherein the second query plan references the first version of the metadata object; and executing the second query a second time inside the first transaction at a time subsequent to time T6 causing the second query plan to be recompiled to generate a third query plan, wherein the third query plan references the second version of the metadata object.

In another embodiment of the foregoing method, the method further comprises operating the relational database system in a second snapshot isolation mode and executing the second query inside the first transaction at a time either prior to or subsequent to time T6 causing a second query plan to be compiled wherein the second query plan references the first version of the metadata object.

A computer program product comprising a computer-readable memory device having computer program logic recorded thereon that when executed by at least one processor of a computing device causes the at least one processor to perform operations is provided herein. The operations comprising: receiving a data read command comprising first and second queries, each query referencing a metadata object in a metadata object in a metadata storage of the relational database system and configured to read user data objects from a user data storage of the relational database system; receiving a metadata modification command to be executed concurrently with the data read command, and wherein execution of the metadata modification command causes the metadata object to be modified; in response to receiving the data read command: starting a first transaction at a time T1; obtaining a metadata access lock from a lock manager of the relational database system; creating a first query plan for the first query, wherein the first query plan references the metadata object; begin executing the first query plan inside the first transaction at a time T2 using the metadata access lock; completing execution of the first query plan at a time T3; and committing the first transaction at a time T4; and in response to receiving the metadata modification command: starting a second transaction concurrently with the first transaction at a time T5; obtaining a metadata change lock; modifying the metadata object inside the second transaction using the metadata change lock, wherein the modification is not blocked by the metadata access lock; and committing the second transaction at a time T6.

In another embodiment of the foregoing computer program product, time T2 is subsequent to time T1, time T5 is subsequent to time T2, time T3 is subsequent to time T5 and time T6 is subsequent to time T3.

In another embodiment of the foregoing computer program product, prior to executing the metadata modification command, the metadata object comprises a first version of the metadata object.

In another embodiment of the foregoing computer program product, executing the metadata modification command causes the first version of the metadata object to be modified into a second version of the metadata object.

In another embodiment of the foregoing computer program product, the operations further comprise operating the relational database system in a first snapshot isolation mode and: executing the second query inside the first transaction at a time prior to T6 causing a second query plan to be compiled, wherein the second query plan references the first version of the metadata object; and executing the second query a second time inside the first transaction at a time subsequent to time T6 causing the second query plan to be recompiled to generate a third query plan, wherein the third query plan references the second version of the metadata object.

In another embodiment of the foregoing computer program product, the operations further comprise operating the relational database system in the second snapshot isolation mode and executing the second query inside the first transaction at a time either prior to or subsequent to time T6 causing a second query plan to be compiled wherein the second query plan references the first version of the metadata object.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A relational database system, comprising:
   a processor; and
   a memory that stores program code structured to cause the processor to:
   receive a single data read command comprising first and second queries that both read data objects, each query referencing a metadata object in metadata storage of the relational database system and configured to read user data objects from a user data storage of the relational database system;
   receive a metadata modification command to be executed concurrently with the single data read command, and wherein execution of the metadata modification command causes the metadata object stored in a metadata storage of the relational database system to be modified;
   in response to receiving the single data read command:
      start a first transaction at a time T1;
      obtain a metadata access lock from a lock manager of the relational database system;
      create a first query plan for the first query, wherein the first query plan references the metadata object;
      begin execution of the first query plan inside the first transaction at a time T2 using the metadata access lock;
      complete execution of the first query plan at a time T3; and
      commit the first transaction at a time T4; and
   in response to receiving the metadata modification command:
      execute the metadata modification command to:
         start a second transaction concurrently with the first transaction at a time T5;
         obtain a metadata change lock from the lock manager;
         modify the metadata object inside the second transaction using the metadata change lock, wherein said modify is not blocked by the metadata access lock; and
         commit the second transaction at a time T6;
      wherein said time T2 is subsequent to said time T1, said time T5 is subsequent to said time T2, said time T3 is subsequent to said time T5 and said time T6 is subsequent to said time T3.

2. The relational database system of claim 1, wherein prior to said executing the metadata modification command, the metadata object comprises a first version of the metadata object.

3. The relational database system of claim 2, wherein said executing the metadata modification command causes the first version of the metadata object to be modified into a second version of the metadata object.

4. The relational database system of claim 3, wherein to operate in a read committed snapshot isolation mode, the program code is further structured to cause the processor to:
   execute the second query inside the first transaction at a time prior to T6 causing a second query plan to be compiled, wherein the second query plan references the first version of the metadata object; and
   execute the second query a second time inside the first transaction at a time subsequent to said time T6 causing the second query plan to be recompiled to generate a third query plan, wherein the third query plan references the second version of the metadata object.

5. The relational database system of claim 3, wherein to operate in a regular snapshot isolation mode, the program code is further structured to cause the processor to:
  execute the second query inside the first transaction at a time either prior to or subsequent to said time T6 causing a second query plan to be compiled wherein the second query plan references the first version of the metadata object; and
  execute the second query a second time inside the first transaction at a time subsequent to said time T6 reusing the second query plan.

6. The relational database system of claim 5, further comprising a transaction manager configured to determine which of the first version or the second version of the metadata object is visible to a transaction at a predetermined time.

7. The relational database system of claim 6, wherein the transaction manager is further configured to determine which of the first version or the second version of the metadata object is visible to a transaction at a predetermined time based at least in part on whether the program code is configured to operate in a read committed snapshot isolation mode, the regular snapshot isolation mode, or a non-snapshot isolation mode.

8. A method in a relational database system, the method comprising:
  receiving a data read command comprising first and second queries, each query referencing a metadata object in a metadata storage of the relational database system and configured to read user data objects from a user data storage of the relational database system;
  receiving a metadata modification command to be executed concurrently with the data read command, and wherein execution of the metadata modification command causes the metadata object to be modified;
  in response to receiving the data read command:
    starting a first transaction at a time T1;
    obtaining a metadata access lock from a lock manager of the relational database system;
    creating a first query plan for the first query, wherein the first query plan references the metadata object;
    beginning execution of the first query plan inside the first transaction at a time T2 using the metadata access lock;
    completing execution of the first query plan at a time T3; and
    committing the first transaction at a time T4; and
  in response to receiving the metadata modification command:
    executing the metadata modification command by:
      starting a second transaction concurrently with the first transaction at a time T5;
      obtaining a metadata change lock from the lock manager;
      modifying the metadata object inside the second transaction using the metadata change lock, wherein said modifying is not blocked by the metadata access lock; and
      committing the second transaction at a time T6;
    wherein said time T2 is subsequent to said time T1, said time T5 is subsequent to said time T2, said time T3 is subsequent to said time T5, and said time T6 is subsequent to said time T3.

9. The method of claim 8, wherein prior to said executing the metadata modification command, the metadata object comprises a first version of the metadata object.

10. The method of claim 9 wherein said executing the metadata modification command causes the first version of the metadata object to be modified into a second version of the metadata object.

11. The method of claim 10 further comprises operating the relational database system in a first snapshot isolation mode and:
  executing the second query inside the first transaction at a time prior to T6 causing a second query plan to be compiled, wherein the second query plan references the first version of the metadata object; and
  executing the second query a second time inside the first transaction at a time subsequent to said time T6 causing the second query plan to be recompiled to generate a third query plan, wherein the third query plan references the second version of the metadata object.

12. The method of claim 11 further comprises operating the relational database system in a second snapshot isolation mode and executing the second query inside the first transaction at a time either prior to or subsequent to said time T6 causing a second query plan to be compiled wherein the second query plan references the first version of the metadata object.

13. The method of claim 10, further comprising:
  determining which of the first version or the second version of the metadata object is visible to a transaction at a predetermined time.

14. The method of claim 12, further comprising:
  determining which of the first version or the second version of the metadata object is visible to a transaction at a predetermined time based at least in part on whether the program code is configured to operate in the first snapshot isolation mode, the second snapshot isolation mode, or a non-snapshot isolation mode.

15. A computer program product comprising a computer-readable medium having computer program logic recorded thereon that when executed by at least one processor of a computing device causes the at least one processor to perform operations, the operations comprising:
  receiving a data read command comprising first and second queries, each query referencing a metadata object in a metadata object in a metadata storage of the relational database system and configured to read user data objects from a user data storage of the relational database system;
  receiving a metadata modification command to be executed concurrently with the data read command, and wherein execution of the metadata modification command causes the metadata object to be modified;
  in response to receiving the data read command:
    starting a first transaction at a time T1;
    obtaining a metadata access lock from a lock manager of the relational database system;
    creating a first query plan for the first query, wherein the first query plan references the metadata object;
    begin executing the first query plan inside the first transaction at a time T2 using the metadata access lock;
    completing execution of the first query plan at a time T3; and
    committing the first transaction at a time T4; and
  in response to receiving the metadata modification command:

executing the metadata modification command by:
  starting a second transaction concurrently with the first transaction at a time T5;
  obtaining a metadata change lock;
  modifying the metadata object inside the second transaction using the metadata change lock, wherein said modifying is not blocked by the metadata access lock; and
  committing the second transaction at a time T6;
wherein said time T2 is subsequent to said time T1, said time T5 is subsequent to said time T2, said time T3 is subsequent to said time T5, and said time T6 is subsequent to said time T3.

16. The computer program product of claim 15, wherein prior to said executing the metadata modification command, the metadata object comprises a first version of the metadata object.

17. The computer program product of claim 16 wherein said executing the metadata modification command causes the first version of the metadata object to be modified into a second version of the metadata object.

18. The computer program product of claim 17, the operations further comprising operating the relational database system in a first snapshot isolation mode and:
  executing the second query inside the first transaction at a time prior to T6 causing a second query plan to be compiled, wherein the second query plan references the first version of the metadata object; and
  executing the second query a second time inside the first transaction at a time subsequent to said time T6 causing the second query plan to be recompiled to generate a third query plan, wherein the third query plan references the second version of the metadata object.

19. The computer program product of claim 18, the operations further comprising operating the relational database system in a second snapshot isolation mode and executing the second query inside the first transaction at a time either prior to or subsequent to said time T6 causing a second query plan to be compiled wherein the second query plan references the first version of the metadata object.

20. The computer program product of claim 19, the operations further comprising:
  determining which of the first version or the second version of the metadata object is visible to a transaction at a predetermined time based at least in part on whether the program code is configured to operate in the first snapshot isolation mode, the second snapshot isolation mode, or a non-snapshot isolation mode.

* * * * *